US012679138B2

(12) United States Patent
Chang et al.

(10) Patent No.: US 12,679,138 B2
(45) Date of Patent: Jul. 14, 2026

(54) FREEWHEEL ASSEMBLY CONVERTIBLE BETWEEN FREEWHEEL AND FIXED-GEAR MODES

(71) Applicant: G. FALCON CYCLE-PARTS CO., LTD, Taichung City (TW)

(72) Inventors: Wei-Yueh Chang, Taichung City (TW); Ryan Eugene Liles, Taichung City (TW)

(73) Assignee: G. FALCON CYCLE-PARTS CO., LTD, Taichung City (TW)

( * ) Notice: Subject to any disclaimer, the term of this patent is extended or adjusted under 35 U.S.C. 154(b) by 357 days.

(21) Appl. No.: 18/595,485

(22) Filed: Mar. 5, 2024

(65) Prior Publication Data

US 2025/0282175 A1     Sep. 11, 2025

(51) Int. Cl.
| | |
|---|---|
| B60B 27/04 | (2006.01) |
| B60B 27/00 | (2006.01) |
| B60B 27/02 | (2006.01) |
| B62L 1/02 | (2006.01) |
| B62L 5/08 | (2006.01) |

(52) U.S. Cl.
CPC ........ B60B 27/047 (2013.01); B60B 27/0047 (2013.01); B60B 27/023 (2013.01); B62L 1/02 (2013.01); B62L 5/08 (2013.01); *B60B 2200/47* (2013.01); *B60B 2900/351* (2013.01)

(58) Field of Classification Search
CPC . B60B 27/023; B60B 27/047; B60B 27/0047; B60B 2200/47; B62L 1/02; B62L 5/08; F16D 41/36

USPC ...................... 301/6.9; 192/20, 217.6, 217.7; 188/24.17, 26
See application file for complete search history.

(56) References Cited

U.S. PATENT DOCUMENTS

| | | | | |
|---|---|---|---|---|
| 2,081,566 | A * | 5/1937 | Winkler .................... | B62L 5/00 192/81 C |
| 2,151,324 | A * | 3/1939 | Jordan .................... | F16D 41/28 192/217.6 |
| 4,588,232 | A * | 5/1986 | Kim ........................ | B60B 37/10 301/1 |
| 6,386,566 | B1 * | 5/2002 | Freeberg .................. | B62K 9/02 280/259 |
| 6,974,275 | B2 * | 12/2005 | Nago ...................... | F16D 65/12 188/26 |
| 2017/0096030 | A1 * | 4/2017 | Engel .................. | B60B 27/0015 |
| 2018/0001957 | A1 * | 1/2018 | Chang ................. | B60B 27/0047 |

* cited by examiner

Primary Examiner — S. Joseph Morano
Assistant Examiner — Eva L Comino
(74) Attorney, Agent, or Firm — WPAT, PC

(57) ABSTRACT

A freewheel assembly has a hub, a brake mechanism, and at least one switch. The hub has an axle, a hub shell mounted around the axle, a drive screw disposed at one of two ends of the hub shell; and a sprocket mounted around the drive screw and having an inner shell and an outer shell. The inner shell is screwed with the drive screw and has a first engaging notch. The outer shell is mounted around the inner shell and has a second engaging notch. The brake mechanism has a clutch cone configured to be driven by the drive screw to move along the axle and at least one brake shoe disposed to an exterior circumference of the clutch cone. Each switch is screwed to the outer shell and has an engaging block engaging with at least one of the first engaging notch and the second engaging notch.

20 Claims, 9 Drawing Sheets

2023

202

FREEWHEEL ASSEMBLY CONVERTIBLE BETWEEN FREEWHEEL AND FIXED-GEAR MODES

BACKGROUND OF THE INVENTION

1. Field of the Invention

The present invention relates to a drivetrain of a bicycle, and more particularly to a freewheel assembly that can be switched between a freewheel mode and a fixed-gear mode.

2. Description of Related Art

A bicycle, also known as a bike or a cycle, is a common small land vehicle with two wheels. A rider of the bicycle can stamp pedals of the bicycle to power the bicycle. Therefore, the bicycle is considered as a green and environmentally friendly means of transportation. Manufacture of bicycles is a traditional industry with a history of more than 100 years. The focus of the world's bicycle industry is changing from the traditional means of transportation to sport bicycles, mountain bicycles, and leisure bicycles.

There are many common types of bicycles, such as single speed bicycles with coaster brakes, fixed-gear bicycles, and single speed bicycles. In a single speed bicycle with a coaster brake, pedals and a sprocket of the bicycle cannot backward rotate together, and such bicycle has to brake by backward stamping the pedals half circle. In a fixed-gear bicycle, pedals and the sprocket of the bicycle are always backward and forward rotate with each other, and such bicycle has to brake by backward stamping the pedals. Finally, a drivetrain of a single speed bicycle provides only forward movement, Various brake functions of bicycles are achieved by different hubs. However, the hub is hard to be altered, and a rider has to purchase different kinds of bicycles to experience the various brake functions. Therefore, it is urgent to design a freewheel assembly with convertible functions to solve the above problems.

To overcome the shortcomings of the conventional hubs, the present invention provides a freewheel assembly to mitigate or obviate the aforementioned problems.

SUMMARY OF THE INVENTION

The main objective of the present invention is to provide a freewheel assembly that can convert to a fixed-gear mode.

The freewheel assembly has a hub, a brake mechanism, and at least one switch. The hub has an axle, a hub shell mounted around the axle, a drive screw disposed at one of two ends of the hub shell; and a sprocket mounted around the drive screw and having an inner shell and an outer shell. The inner shell is screwed with the drive screw and has a first engaging notch. The outer shell is mounted around the inner shell and has a second engaging notch. The brake mechanism has a clutch cone configured to be driven by the drive screw to move along the axle and at least one brake shoe disposed to an exterior circumference of the clutch cone. Each switch is screwed to the outer shell and has an engaging block engaging with at least one of the first engaging notch and the second engaging notch.

Other objects, advantages, and novel features of the invention will become more apparent from the following detailed description when taken in conjunction with the accompanying drawings.

DETAILED DESCRIPTION OF PREFERRED EMBODIMENTS

Figure 1:
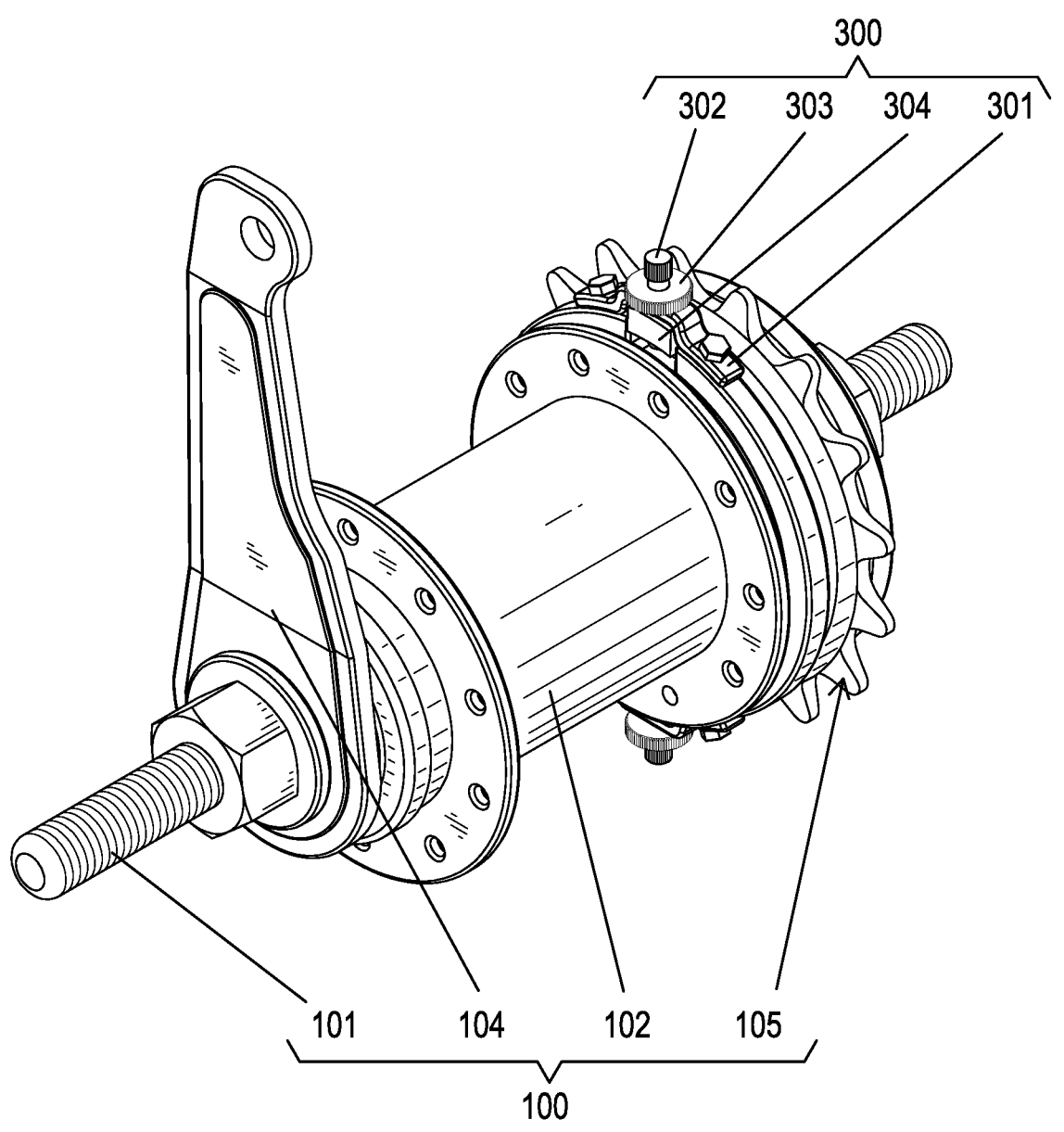
FIG. 1 is a perspective view of a first embodiment of a freewheel assembly in accordance with the present invention.
Figure 2:
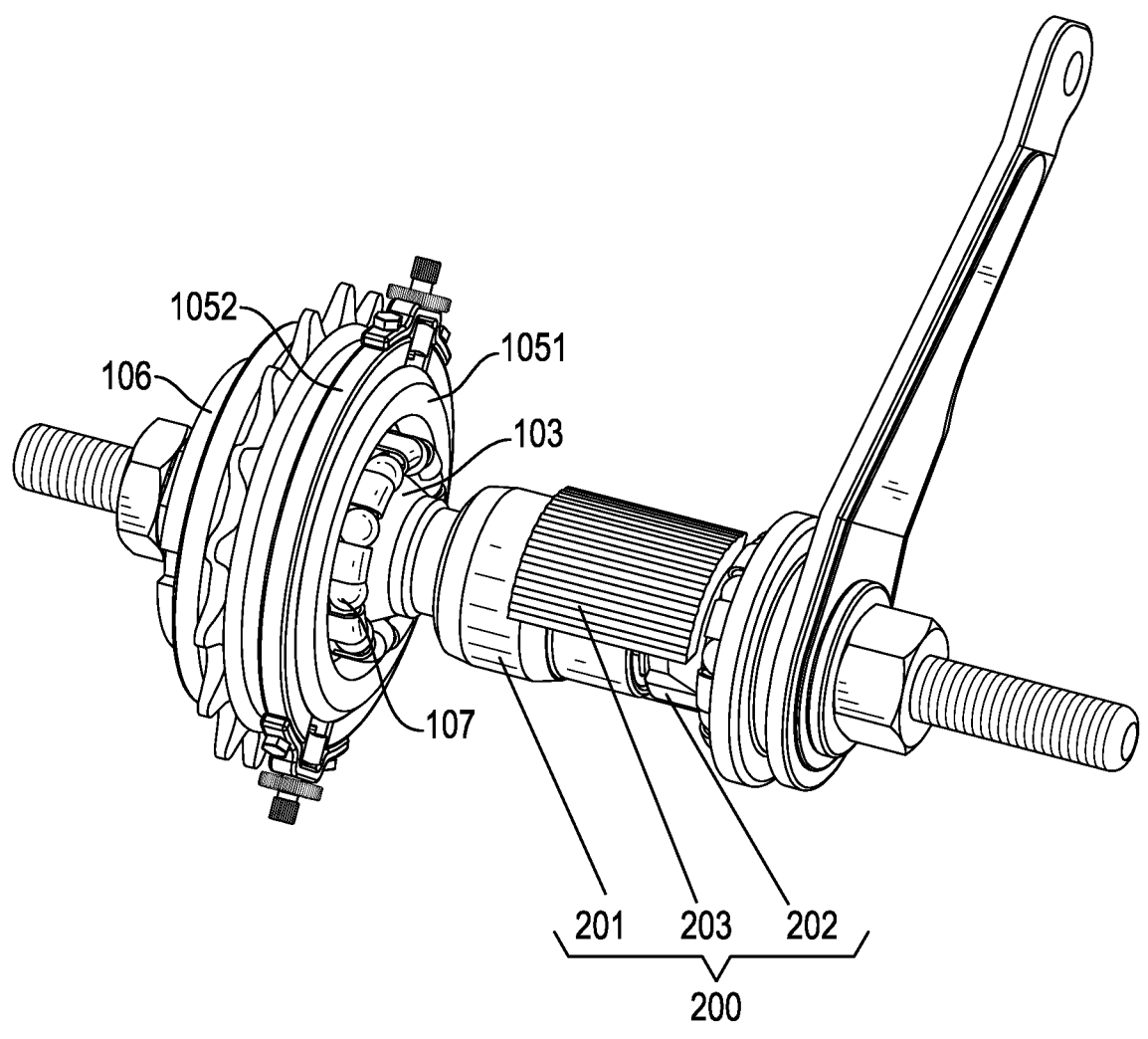
FIG. 2 is a perspective view of the freewheel assembly in FIG. 1, shown with a hub shell of the freewheel assembly omitted.

With reference to FIGS. 1, 2, 7, and 8, a first embodiment of a freewheel assembly in accordance with the present invention has a hub 100, a brake mechanism 200, at least one switch 300, and a spring holder 400. The hub 100 has an axle 101, a hub shell 102, a drive screw 103, a brake arm 104, a sprocket 105, a lock nut 106, and three ball bearing retainers 107. The hub shell 102 is mounted around the axle 101 and has two opposite ends. The drive screw 103 is disposed at one of the two ends of the hub shell 102. The brake arm 104 is disposed at the other one of the two ends of the hub shell 102. The sprocket 105 is screwed to an exterior circumference of the drive screw 103 and is more steadily than a connection provided by splines of bike cassettes. The sprocket 105 has an inner shell 1051 and an outer shell 1052. The inner shell 1051 is screwed with the drive screw 103 and engages with the outer shell 1052 by a ratchet. The inner shell 1051 has at least one first engaging notch 1053 disposed at an exterior rim of the inner shell 1051. The outer shell 1052 has at least one second engaging notch 1054 disposed at an exterior rim of the outer shell 1052. The lock nut 106 is disposed aside the sprocket 105.

The brake mechanism 200 is disposed within the hub shell 102 and has a clutch cone 201, a brake cone 202, and at least one brake shoe 203. The clutch cone 201 is mounted around the axle 101 and is screwed with the drive screw 103. The brake cone 202 is mounted around and fixed to the axle 101. The spring holder 400 is disposed at an end, of the brake cone 202, heading to the clutch cone 201. The spring holder 400 has at least one limiting strip 401 fixed to an end of the spring holder 400. The brake cone 202 has at least one limiting groove 2021 and disposed at an end, of the brake cone 202, heading to the clutch cone 201. The at least one limiting groove 2021 is configured to respectively accommodate the at least one limiting strip 401. Each of the at least one brake shoe 203 is disposed to an exterior circumference of the brake cone 202 and the exterior circumference of the clutch cone 201.

Each of the at least one switch 300 is fixed above a corresponding one of the at least one second engaging notch 1054. In addition, each switch 300 has a screwing plate 301, an adjusting bolt 302, an adjusting nut 303, and an engaging block 304. The screwing plate 301 has two opposite ends screwed to the outer shell 1052. The adjusting bolt 302 passes through the screwing plate 301. The adjusting nut 303 is threaded with the adjusting bolt 302 and is disposed at a top of the screwing plate 301. The engaging block 304 is threaded with the adjusting bolt 302 and is disposed below the screwing plate 301. As the adjusting nut 303 is rotated, the adjusting bolt 302 moves axially to adjust a position of the engaging block 304 along the adjusting bolt 302. The freewheel assembly of the present invention is in a freewheel mode as the engaging block 304 is disposed in the corresponding one of the at least one second engaging notch 1054. When a rider pedals backward to rotate the sprocket 105, the drive screw 103 is still, and the freewheel assembly performs as a normal freewheel. When the engaging block 304 is disposed in a corresponding one of the at least first engaging notch 1053 below the abovementioned second engaging notch 1054, the freewheel assembly of the present is switched to a fixed-gear mode. When the rider pedals backward to rotate the sprocket 105, the drive screw 103 is driven by the sprocket 105 to push the clutch cone 201 till said limiting strip 401 of the spring holder 400 is inserted into said limiting groove 2021 of the brake cone 202. The limiting strip 401 is blocked by the limiting groove 2021, and the clutch cone 201 cannot rotate backward. Meanwhile, the clutch cone 201 pushes said brake shoe 203, and the brake shoe 203 is pushed to rub an interior circumference of the hub shell 102 to achieve a brake function. The abovementioned brake function is conventional and is not further described in detail. Practically, a compression spring may be deployed between the screwing plate 301 and the engaging block 304 to push the engaging block 304.

In addition, the brake cone 202 has at least one positioning notch 2023 disposed at the exterior circumference of the brake cone 202. Each brake shoe 203 has a positioning protrusion 2031 engaging with a corresponding one of the at least one positioning notch 2023 of the brake cone 202. Each positioning notch 2023 has a first curved face therein. Each brake shoe 203 has a second curved face disposed at a side of the brake shoe 203. The second curved face of each brake shoe 203 is configured to fit the first curved face of the corresponding positioning notch 2023 of the brake cone 202. Consequently, each brake shoe 203 can be positioned by said positioning notch 2023, and a gap between the brake shoe 2023 and the brake cone 202 is reduced.

Specifically, said at least one first engaging notch 1053 is implemented as two first engaging notches 1053, and said at least one second engaging notch 1054 is implemented as two second engaging notches 1054. The two first engaging notches 1053 and the two second engaging notches 1054 are aligned with one another. Therefore, position of the engaging block 304 of each switch 300 can be easily adjusted inside a corresponding one of the first engaging notches 1053 and a corresponding one of the second engaging notches 1054 to switch the freewheel assembly of the present invention between the freewheel mode and the fixed-gear mode.

Wherein, an opening of each first engaging notch 1053 and an opening of each second engaging notch 1054 are in the same size and are both larger than a cross-sectional area of the engaging block 304 of each switch 300. Consequently, the engaging block 304 can be embedded in one corresponding first engaging notch 1053 and in one corresponding second engaging notch 1054 certainly. Furthermore, a height of the engaging block 304 of each switch 300 is equal to a depth of each second engaging notch 1054 to prevent movement of the outer shell 1052 from interfering with movement of the inner shell 1051.

Specifically, the three ball bearing retainers 107 of the hub 100 are respectively disposed at the exterior circumference of the brake cone 202, a middle of the exterior circumference of the drive screw 103, and an end of an interior circumference of the drive screw 103. The three ball bearing retainers 107 support the brake cone 202 and the drive screw 103 and promote stability of the structure of the freewheel assembly of the present invention. The three ball bearing retainers 107 also reduce the friction produced during operation of the freewheel assembly of the present invention and make said freewheel easy to rotate.

A Second Embodiment

Figure 3:
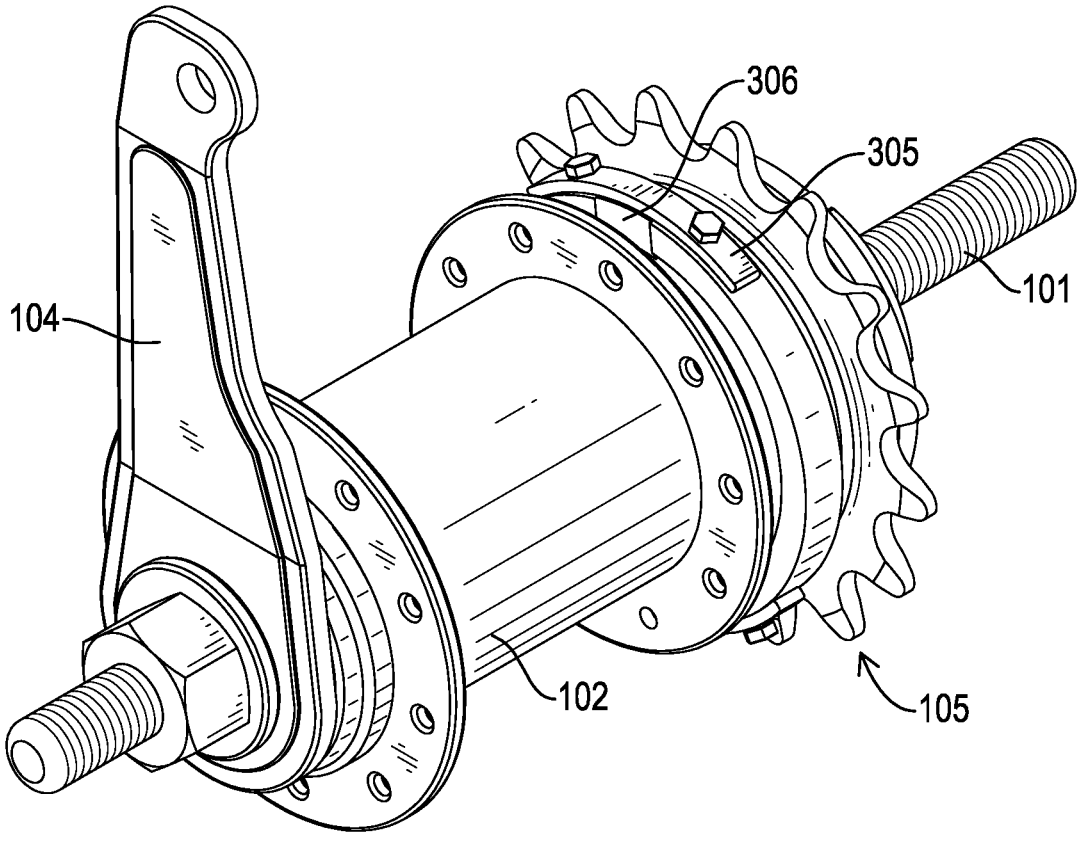
FIG. 3 is a perspective view of a second embodiment of the freewheel assembly in accordance with the present invention.
Figure 4:
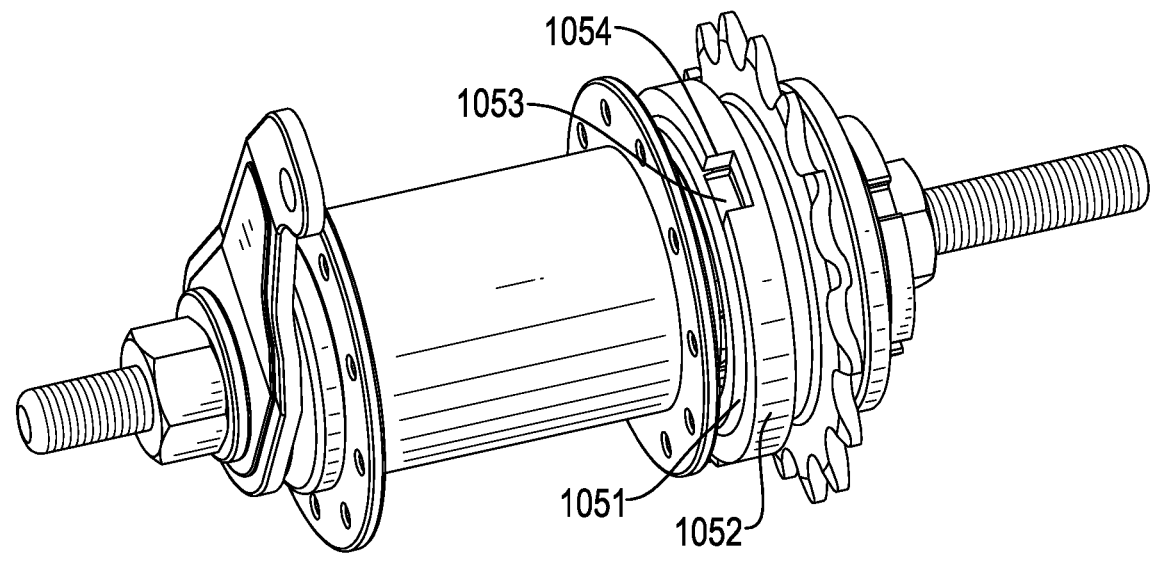
FIG. 4 is a perspective view of the second embodiment of the freewheel assembly in FIG. 3, shown with a fixing plate of the freewheel assembly omitted.
Figure 5:
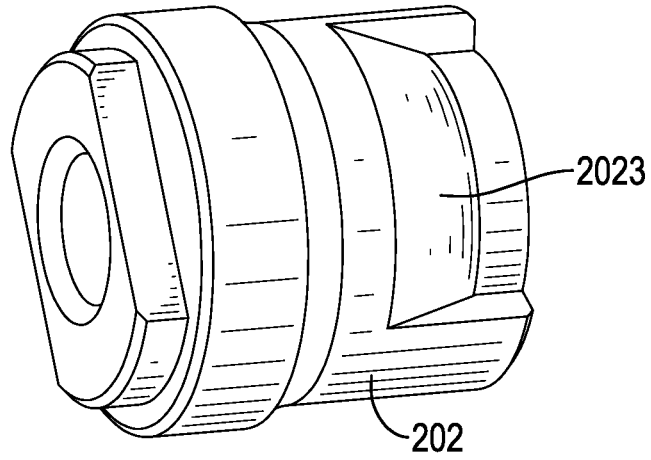
FIG. 5 is a perspective view of a brake cone of a brake mechanism of the freewheel assembly of the present invention.
Figure 6:
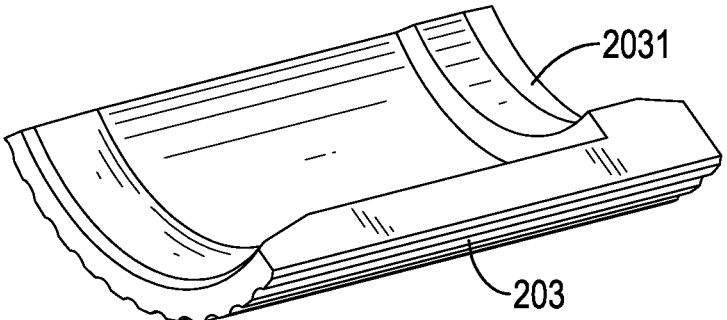
FIG. 6 is a perspective view of a brake shoe of the brake mechanism of the freewheel assembly of the present invention.
Figure 7:
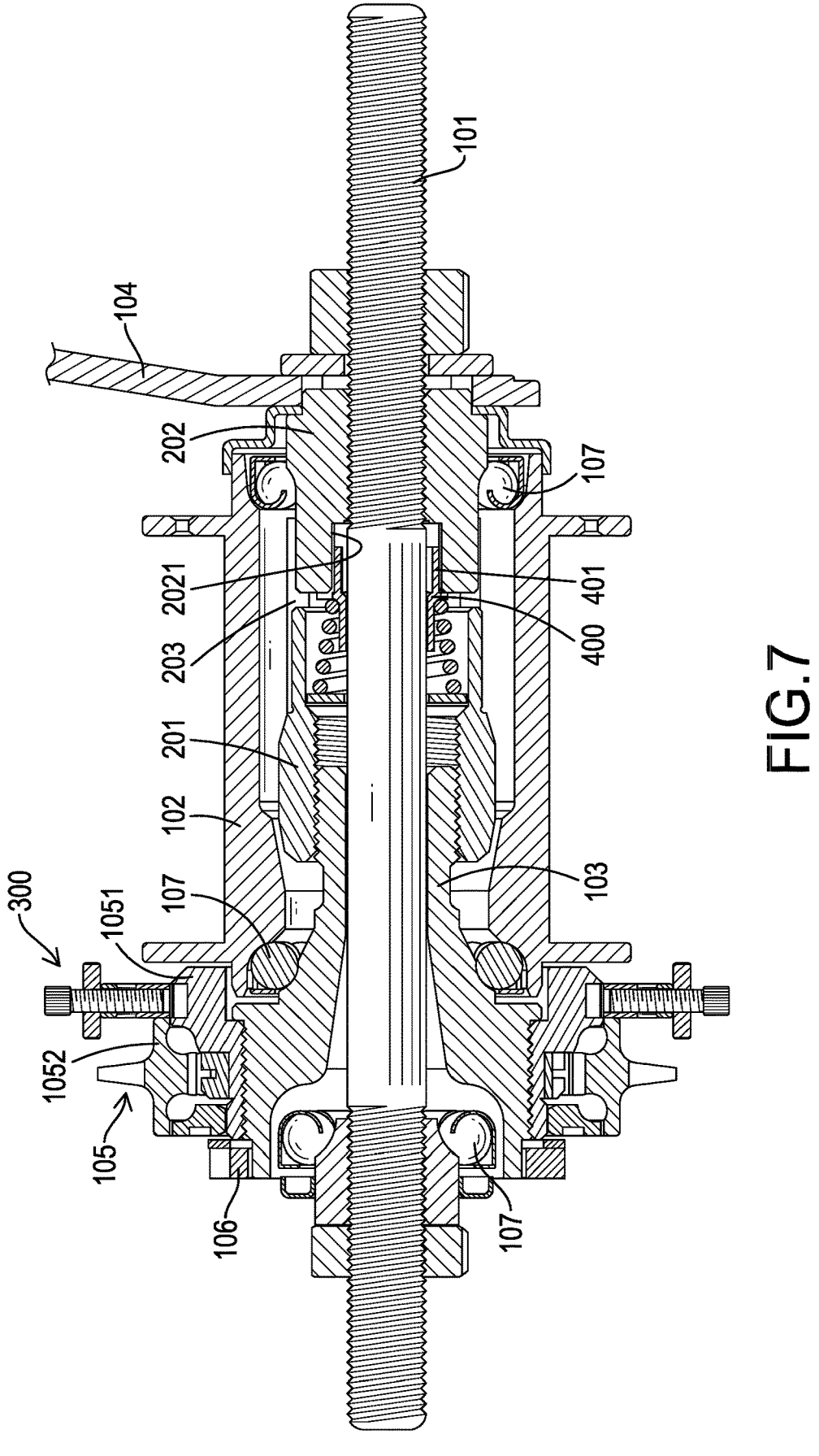
FIG. 7 is a side view in partial section of the freewheel assembly in FIG. 1.
Figure 8:
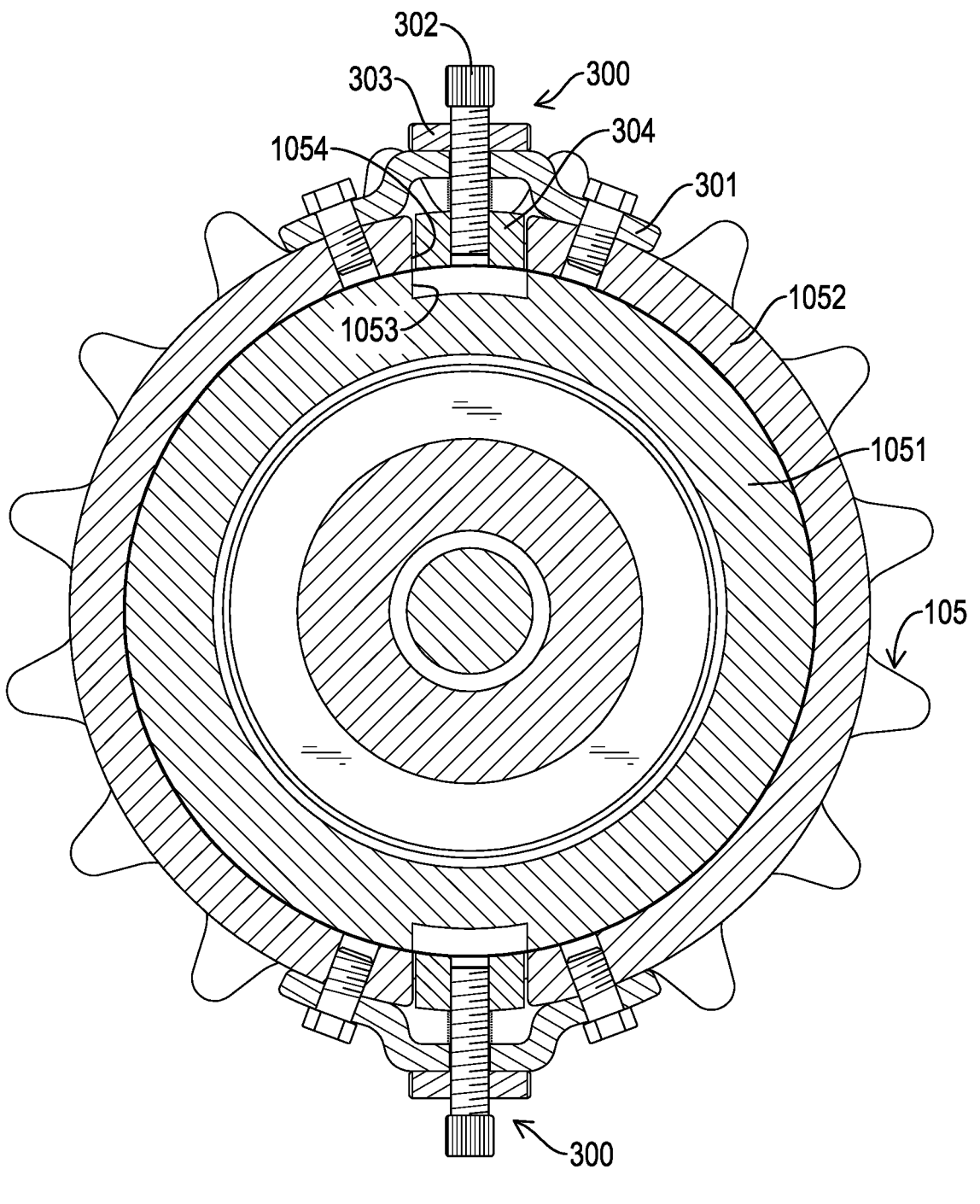
FIG. 8 is a cross-sectional side view of the freewheel assembly in FIG. 1.
Figure 9:
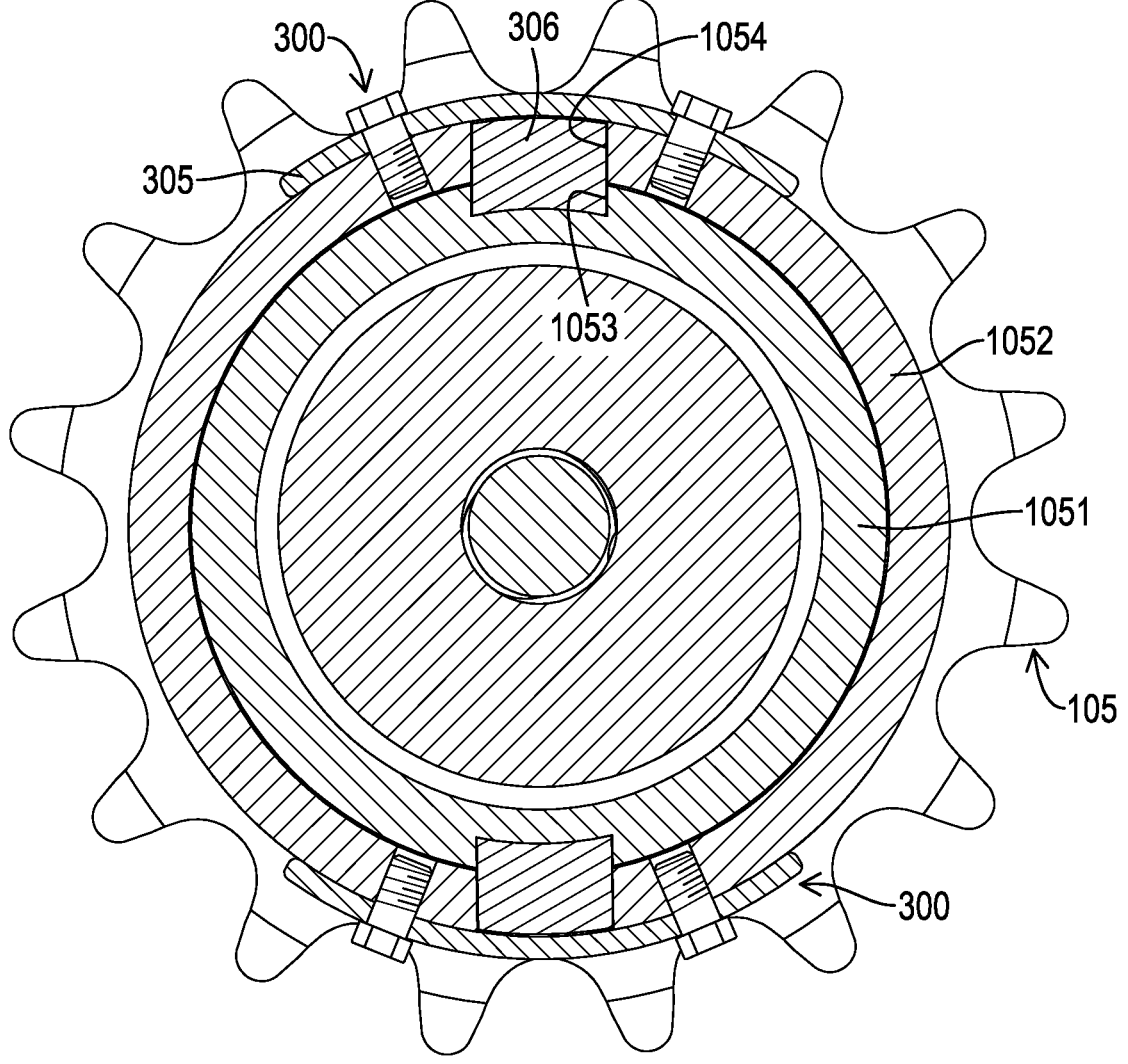
FIG. 9 is a cross-sectional side view of the freewheel assembly in FIG. 3.

With reference to FIGS. 3, 6, and 9, the second embodiment differs from the first embodiment in that each switch 300 has a fixing plate 305 and an engaging block 306. The fixing plate 305 has two opposite ends screwed to the outer shell 1052. The engaging block 306 is disposed at a bottom of the fixing plate 305. In the second embodiment, the freewheel assembly of the present invention is switched from the freewheel mode to the fixed-gear mode by the engaging block 306 engaging in one corresponding second notch 1054 and one corresponding first engaging notch 1053 below said corresponding second engaging notch 1054. When the rider stamps backward to rotate the sprocket 105, the drive screw 103 is driven by the sprocket 105 to push the clutch cone 201 till said limiting strip 401 of the spring holder 400 is inserted into said limiting groove 2021 of the brake cone 202. The limiting strip 401 is blocked by the limiting groove 2021, and the clutch cone 201 cannot rotate backward. Meanwhile, the clutch cone 201 pushes said brake shoe 203, and the brake shoe 203 is pushed to rub an interior circumference of the hub shell 102 to achieve a brake function. When the fixing plate 305 and the engaging block 306 are removed, the freewheel assembly of the present invention is switched from the fixed-gear mode to the freewheel mode. When the rider stamps backward to rotate the sprocket 105, the drive screw 103 is still, and the freewheel assembly performs as a normal freewheel.

Working principle of the freewheel assembly of the present invention: when the freewheel assembly of the present invention is in use, the sprocket 105 is mounted around the drive screw 103 and fixed by tightening the lock nut 106. By pushing each engaging block 304/306 of each switch 300 in one corresponding first engaging notch 1053 and one corresponding second engaging notch 1054, the freewheel assembly of the present invention is switched from the freewheel mode of the fixed-gear mode. When the rider stamps backward to rotate the sprocket 105, the drive screw 103 is driven by the sprocket 105 to push the clutch cone 201 till said limiting strip 401 of the spring holder 400 is inserted into said limiting groove 2021 of the brake cone 202. The limiting strip 401 is blocked by the limiting groove 2021, and the clutch cone 201 cannot rotate backward. Meanwhile, the clutch cone 201 pushes said brake shoe 203, and the brake shoe 203 is pushed to rub an interior circumference of the hub shell 102 to achieve a brake function. The freewheel assembly of the present invention is switched back to the freewheel mode to operate as a normal freewheel by disengaging each engaging block 304 from said corresponding first engaging notch 1053 or by removing the fixing plate 305 and the engaging block 306. The freewheel assembly of the present invention has an advance design and a compact structure, is easy to use, and operates reliably. Conversion between the freewheel mode and the fixed-gear mode is achieved via said first engaging notch 10523 of the inner shell 1051, said second engaging notch 1054 of the outer shell 1052, and said switch 300.

The freewheel assembly of the present invention meets people's demands for different functions of bicycles and massively reduces the cost of purchasing components of bicycles.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A freewheel assembly comprising:
a hub having
an axle;
a hub shell mounted around the axle and having two opposite ends;
a drive screw disposed at one of the two ends of the hub shell; and
a brake arm disposed at the other one of the two ends of the hub shell;
a sprocket mounted around the drive screw and having
an inner shell screwed with an exterior circumference of the drive screw and having a first engaging notch disposed at an exterior rim of the inner shell; and
an outer shell mounted around the inner shell and having a second engaging notch disposed at an exterior rim of the outer shell;
a brake mechanism having
a clutch cone disposed within the hub shell, mounted around the axle, and configured to be driven by the drive screw to move along the axle;
a brake cone disposed within the hub shell and fixed to the axle; and
at least one brake shoe disposed within the hub shell and disposed to an exterior circumference of the clutch cone and an exterior circumference of the brake cone; and
at least one switch, each of the at least one switch screwed to the outer shell of the sprocket and having
an engaging block engaging with at least one of the first engaging notch of the inner shell and the second engaging notch of the outer shell.

2. The freewheel assembly as claimed in claim 1, wherein each of the at least one switch has
a screwing plate having two ends screwed to the outer shell of the sprocket;
an adjusting bolt inserted through the screwing plate; and
an adjusting nut threaded with the adjusting bolt and disposed at a top of the screwing plate; and
the engaging block is threaded with the adjusting bolt and is disposed below the screwing plate.

3. The freewheel assembly as claimed in claim 1, wherein each one of the at least one switch has a fixing plate having two ends screwing to the outer shell of the sprocket; and
the engaging block is fixed to a bottom of the fixing plate.

4. The freewheel assembly as claimed in claim 1, wherein
the brake cone has at least one positioning notch disposed at the exterior circumference of the brake cone; and
each one of the at least one brake shoe has a positioning protrusion engaging with a corresponding one of the at least one positioning notch of the brake cone.

5. The freewheel assembly as claimed in claim 1, wherein
the at least one first engaging notch of the inner shell includes two said first engaging notches;
the at least one second engaging notch of the outer shell includes two said second engaging notches; and
the two first engaging notches and the two second engaging notches are aligned.

6. The freewheel assembly as claimed in claim 2, wherein an opening of each one of the at least one first engaging notch and an opening of each one of the at least one second engaging notch are in the same size and are both larger than a cross-sectional area of the engaging block of each one of the at least one switch.

7. The freewheel assembly as claimed in claim 1, wherein the hub has three ball bearing retainers respectively disposed at the exterior circumference of the brake cone, a middle of the exterior circumference of the drive screw, and an end of an interior circumference of the drive screw.

8. The freewheel assembly as claimed in claim 2, wherein a compression spring is deployed between the screwing plate and the engaging block of each one of the at least one switch.

9. The freewheel assembly as claimed in claim 1, wherein the hub has a lock nut disposed aside the sprocket.

10. The freewheel assembly as claimed in claim 2, wherein the hub has a lock nut disposed aside the sprocket.

11. The freewheel assembly as claimed in claim 3, wherein the hub has a lock nut disposed aside the sprocket.

12. The freewheel assembly as claimed in claim 4, wherein the hub has a lock nut disposed aside the sprocket.

13. The freewheel assembly as claimed in claim 5, wherein the hub has a lock nut disposed aside the sprocket.

14. The freewheel assembly as claimed in claim 6, wherein the hub has a lock nut disposed aside the sprocket.

15. The freewheel assembly as claimed in claim 7, wherein the hub has a lock nut disposed aside the sprocket.

16. The freewheel assembly as claimed in claim 1, wherein
the freewheel assembly has a spring holder disposed at an end of the brake cone and having at least one limiting strip; and
the brake cone has at least one limiting groove configured to respectively accommodate the at least one limiting strip.

17. The freewheel assembly as claimed in claim 2, wherein
the freewheel assembly has a spring holder disposed at an end of the brake cone and having at least one limiting strip; and
the brake cone has at least one limiting groove configured to respectively accommodate the at least one limiting strip.

18. The freewheel assembly as claimed in claim 3, wherein
the freewheel assembly has a spring holder disposed at an end of the brake cone and having at least one limiting strip; and the brake cone has at least one limiting groove configured to respectively accommodate the at least one limiting strip.

19. The freewheel assembly as claimed in claim 4, wherein the freewheel assembly has a spring holder disposed at an end of the brake cone and having at least one limiting strip; and the brake cone has at least one limiting groove configured to respectively accommodate the at least one limiting strip.

20. The freewheel assembly as claimed in claim 5, wherein the freewheel assembly has a spring holder disposed at an end of the brake cone and having at least one limiting strip; and the brake cone has at least one limiting groove configured to respectively accommodate the at least one limiting strip.

* * * * *